(12) United States Patent
Sprock et al.

(10) Patent No.: US 7,780,241 B2
(45) Date of Patent: Aug. 24, 2010

(54) TWO-PIECE EXPANDABLE THRUST WASHER AND MACHINE USING SAME

(75) Inventors: Christopher M. Sprock, Decatur, IL (US); Christopher J. Beckman, Forsyth, IL (US)

(73) Assignee: Caterpillar Inc, Peoria, IL (US)

( * ) Notice: Subject to any disclaimer, the term of this patent is extended or adjusted under 35 U.S.C. 154(b) by 639 days.

(21) Appl. No.: 11/811,914

(22) Filed: Jun. 12, 2007

(65) Prior Publication Data

US 2008/0309040 A1 Dec. 18, 2008

(51) Int. Cl.
B62D 61/12 (2006.01)
(52) U.S. Cl. .................. 298/17 S; 280/86.75
(58) Field of Classification Search ............. 298/17 S, 298/22 R; 280/86.75, 124.1; 180/349; 411/537, 411/539, 535, 536; 464/132, 134
See application file for complete search history.

(56) References Cited

U.S. PATENT DOCUMENTS

| | | | |
|---|---|---|---|
| 4,082,377 A | 4/1978 | Saunders | |
| 4,398,617 A | 8/1983 | Crabb et al. | |
| 4,690,573 A | 9/1987 | Huffman | |
| 5,020,820 A | 6/1991 | Renner et al. | |
| 5,163,700 A | 11/1992 | Loeber | |
| 5,273,317 A | 12/1993 | Kunz et al. | |
| 5,489,255 A | 2/1996 | Hinckley et al. | |
| 5,865,678 A | 2/1999 | Koedam et al. | |
| 6,086,076 A | 7/2000 | Prem et al. | |
| 6,231,264 B1 | 5/2001 | McLaughlin et al. | |
| 6,357,766 B1 | 3/2002 | Hall et al. | |
| 6,550,795 B1 | 4/2003 | Schlosser et al. | |
| 6,669,303 B2 * | 12/2003 | Dodd | 298/17 B |
| 6,976,688 B2 | 12/2005 | Archer et al. | |

* cited by examiner

*Primary Examiner*—Stephen Gordon
(74) *Attorney, Agent, or Firm*—Liell & McNeil

(57) ABSTRACT

A machine includes a clevis joint connecting a first frame structure to a second frame structure. The clevis joint includes two plates configured to receive a rotatable element of the first frame structure. An expandable thrust washer is positioned on at least one side of the rotatable element. A pin extends through the two plates, the rotatable element, and the expandable thrust washer. The expandable thrust washer has a variably selected length and includes an outer ring configured to receive at least a portion of an inner ring. Expanding the expandable thrust washer to an expanded length reduces clearance along an axis of the clevis joint.

12 Claims, 6 Drawing Sheets

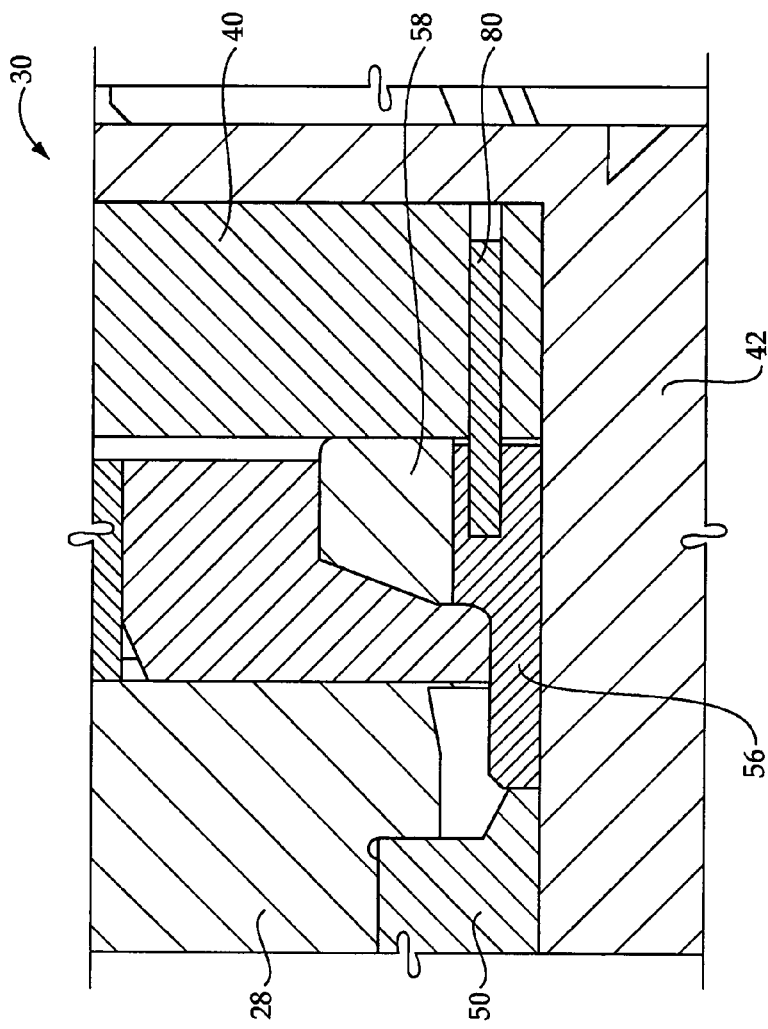
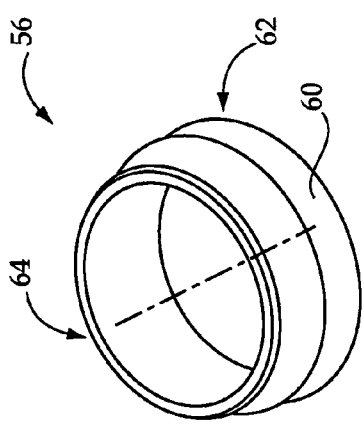
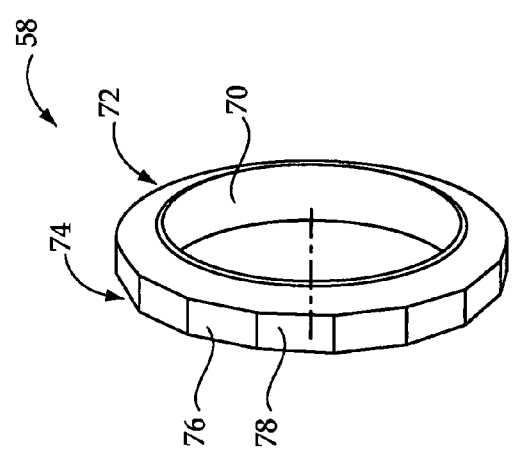

TWO-PIECE EXPANDABLE THRUST WASHER AND MACHINE USING SAME

TECHNICAL FIELD

The present disclosure relates generally to a two-piece thrust washer for preventing movement along an axis, and more particularly to a two-piece thrust washer that is expandable along the axis to reduce a clearance in an assembly for a machine.

BACKGROUND

Thrust washers are used to prevent movement along the axis of a shaft and to support an axial load on the shaft. They are usually made of steel, bronze, plastic, or other useful material, and are often employed in high wear applications, such as motors, winches, pumps, and axle assemblies.

In a typical axle assembly of a machine, an axle, such as, for example, a rear axle, is rigidly connected to a first end of an A-frame structure. A second end of the A-frame structure or, more specifically, the apex of the A-frame structure is pivotably connected to a main frame of the machine at a clevis joint. The clevis extends from the center of a tube having two end plates welded to opposing inner surfaces of the main frame. The clevis joint includes two parallel plates having central openings configured to receive a pin assembly.

The apex of the A-frame structure is positioned between the two clevis plates, and a pin is passed through both the openings in the clevis plates and the apex to secure the A-frame in place. A spherical plain bearing is employed to allow some rotational movement of the A-frame in relation to the clevis joint. Two thrust washers are positioned about the pins on either side of the spherical bearing to take up space along the axis of the pin.

To facilitate assembly, a thickness of the A-frame apex, including the spherical plain bearing and thrust washers, must be less than the clearance between the clevis plates. Once the A-frame apex is secure, however, this clearance provides space along the axis of the clevis joint along which the joint elements may transversely slide. This movement may cause impact loading, which may, in turn, damage the elements of the joint, particularly the bearing.

It is common to use shims and plates to reduce clearance within the joint. However, introducing additional parts to the joint adds time and cost to the assembly process. Another similar solution includes a set of steel wedges that take up clearance existing along an axis of a joint. Specifically, U.S. Pat. No. 4,690,573 includes a take up adjuster that may be placed between a thrust washer and a bracket. The take up adjuster includes a bolt or nut, which can be adjusted to force two sloped wedge plates toward one another. As these wedge plates come together, they contact a second set of wedge plates and force those wedge plates upward into space that may exist between the thrust washer and bracket. This reference does not, however, contemplate a thrust washer that expands to reduce the clearance existing after the joint is assembled.

The present disclosure is directed to one or more of the problems set forth above.

SUMMARY OF THE DISCLOSURE

In one aspect, a machine includes a clevis joint connecting a first frame structure to a second frame structure. The clevis joint includes two plates configured to receive a rotatable element of the first frame structure. An expandable thrust washer is positioned on at least one side of the rotatable element. A pin extends through the two plates, the rotatable element, and the expandable thrust washer. The expandable thrust washer has a variably selected length and includes an outer ring configured to receive at least a portion of an inner ring.

In one aspect, a machine having a ground engaging element includes a metallic structure having a first end fixedly attached to a first metallic piece, and a second end pivotally attached to a second metallic piece at a clevis joint. The clevis joint includes two plates configured to receive the second end, a spherical bearing housed at least partially within the second end, and an expandable thrust washer positioned on at least one side of the spherical bearing. A pin extends through the two plates, the second end, the spherical bearing, and the expandable thrust washer. The expandable thrust washer has a variably selected length and includes an outer ring configured to receive at least a portion of an inner ring.

In another aspect, a method of assembling a machine includes a step of positioning an expandable thrust washer on at least one side of a rotatable element to form a subassembly. The subassembly is positioned between two plates of a clevis joint. A pin is inserted through the two plates of the clevis joint and the subassembly. A length of the expandable thrust washer is adjusted to reduce clearance between the subassembly and the clevis joint.

In another aspect, a clevis joint assembly includes a clevis joint having two plates configured to receive a rotatable element. An expandable thrust washer is positioned on at least one side of the rotatable element. A pin extends through the two plates, the rotatable element, and the expandable thrust washer. The expandable thrust washer has a variably selected length and includes an outer ring configured to receive at least a portion of an inner ring.

BRIEF DESCRIPTION OF THE DRAWINGS

FIG. 4 is an isometric diagrammatic view of an inner ring of an expandable thrust washer according to the present disclosure;

FIG. 5 is an isometric diagrammatic view of an outer ring of an expandable thrust washer according to the present disclosure;

FIG. 6 is a partial sectional view along lines 3-3 of FIG. 2, showing an inner locking mechanism for use with an expandable thrust washer according to the present disclosure;

DETAILED DESCRIPTION

Figure 1:
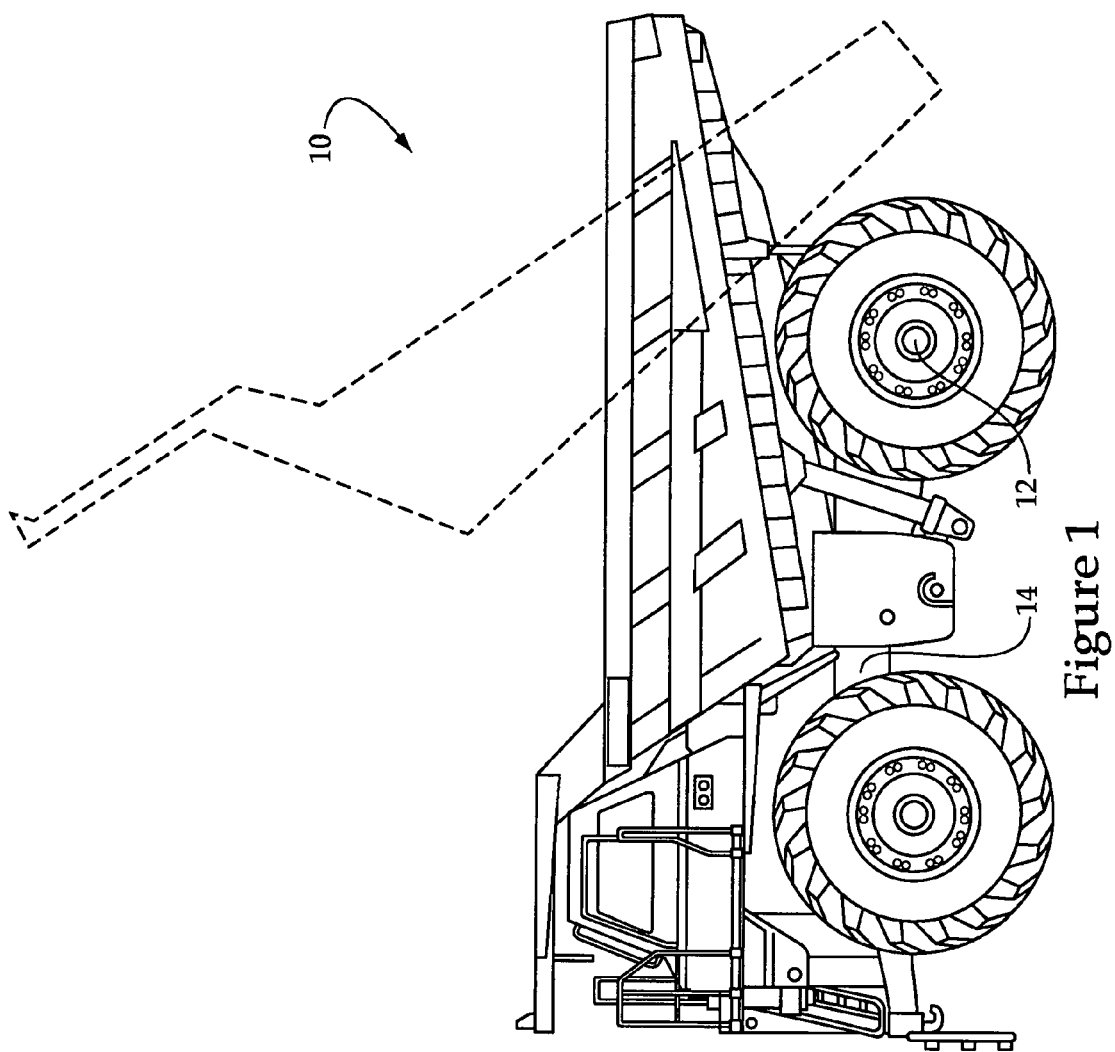
FIG. 1 is a side diagrammatic view of a machine having a rear axle support assembly according to the present disclosure.

An exemplary embodiment of a machine 10 is shown generally in FIG. 1. The machine 10 may be a mining truck, as shown, or any other vehicle having an axle assembly that includes a first frame structure connected to a second frame structure at a clevis joint. The first frame structure may include a connection to a portion of the axle assembly of the machine 10, such as, for example, a rear axle assembly 12, and the second frame structure may include a connection to a main frame 14 of the machine.

Figure 2:
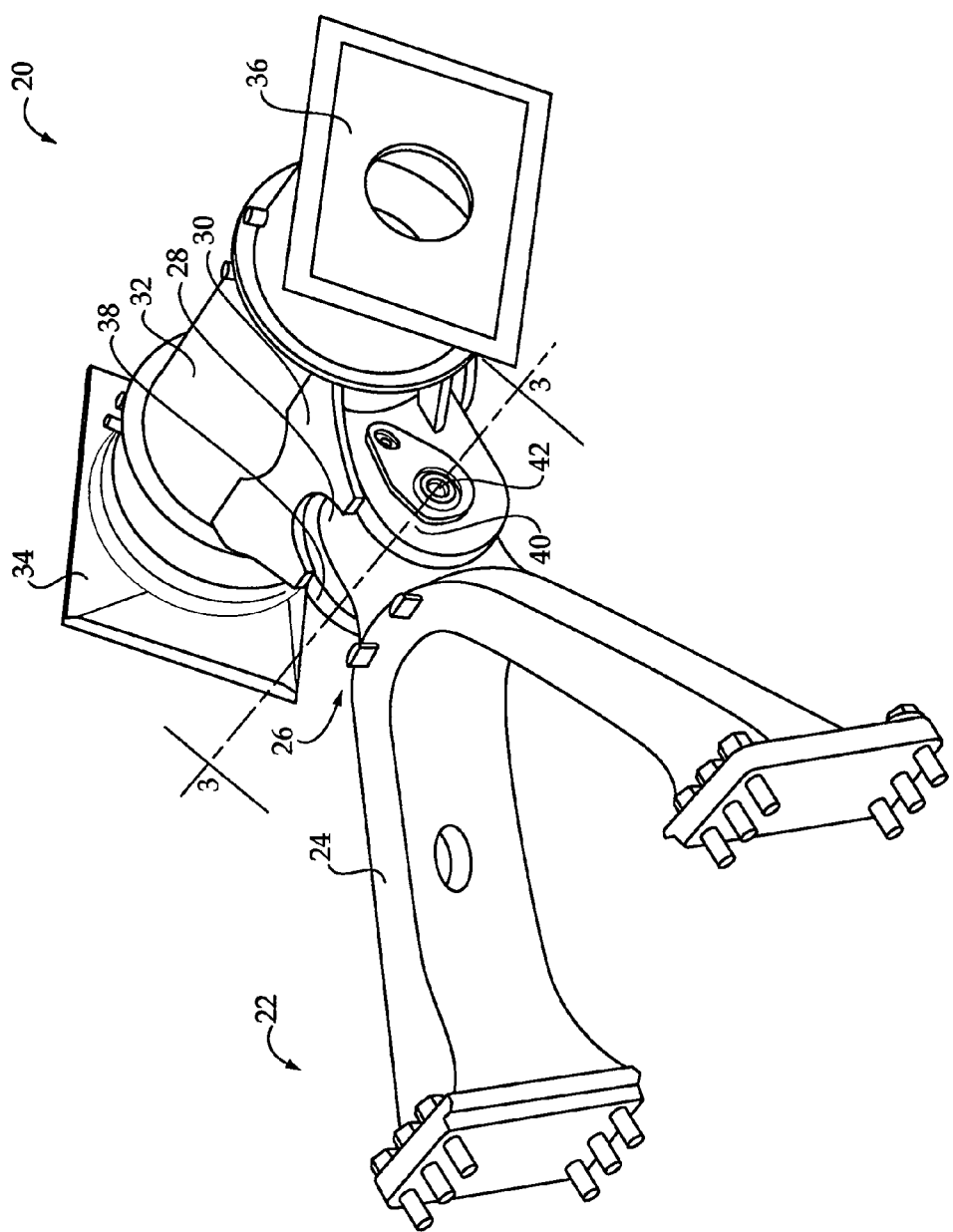
FIG. 2 is a side diagrammatic view of the rear axle support assembly of the machine of FIG. 1.

FIG. 2 illustrates a support group and rear axle support assembly 20 of machine 10. An axle, such as, for example, rear axle assembly 12, is rigidly connected to a first end 22 of a first frame structure, such as, for example, an A-frame structure 24. The rigid connection may include a bolted or welded connection, or any other secure connection. A second end 26 of the A-frame structure 24 or, more specifically, an apex or rotatable element 28 of the A-frame, is pivotally connected to the main frame 14 of the machine 10 at a clevis joint 30, as is known in the art. The clevis joint 30 extends from the center of a second frame structure, such as, for example, a tubular member 32 having two end plates 34 and 36 welded, bolted, or otherwise secured to opposing inner surfaces of the main frame 14. The clevis joint 30 includes two parallel plates 38 and 40 having central openings configured to receive a pin 42. The apex 28 of the A-frame structure 24 is positioned between the two clevis plates 38 and 40, and the pin 42 is passed through the openings in each of the clevis plates 38 and 40 and the apex to secure the A-frame in place.

Figure 3:
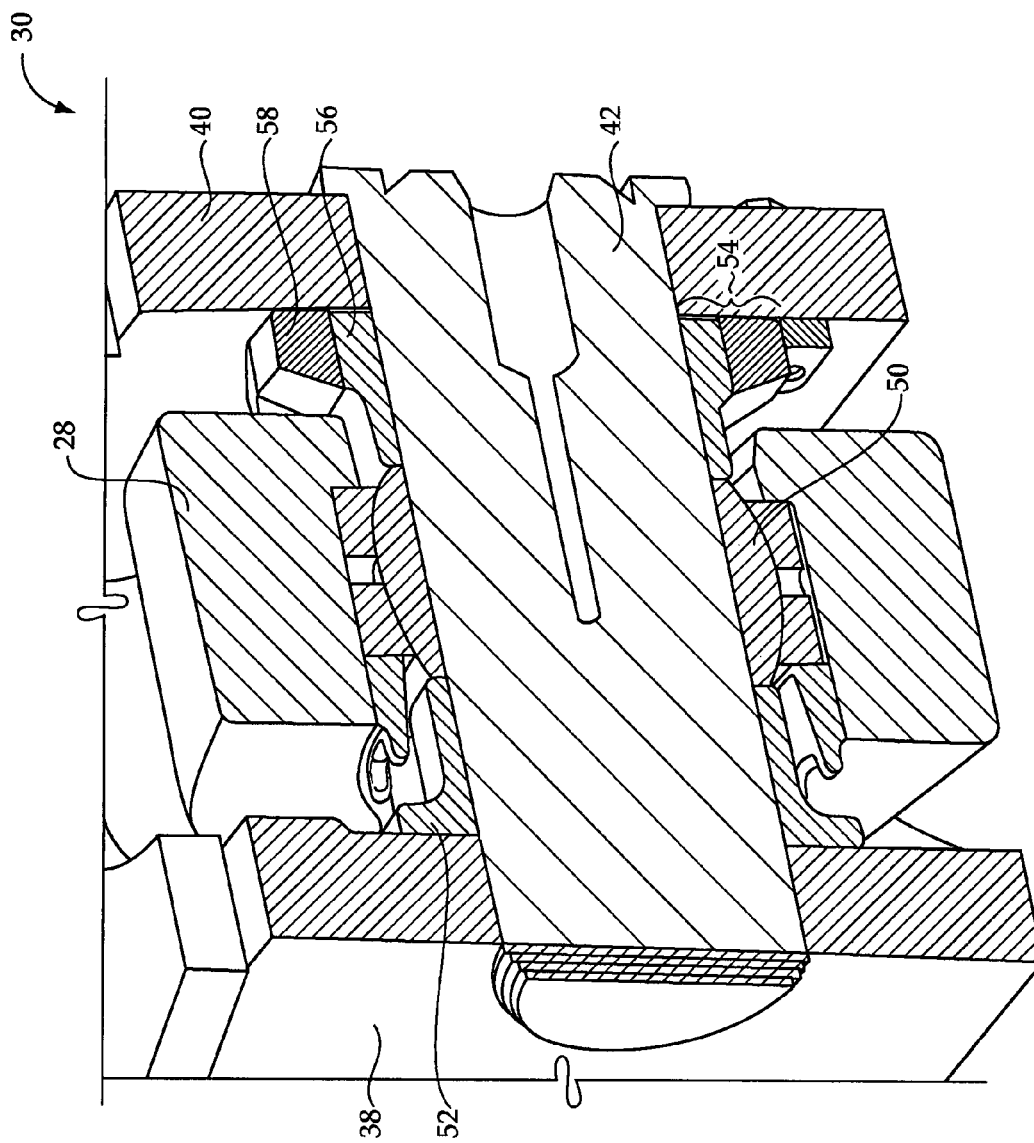
FIG. 3 is an isometric sectional diagrammatic view of the clevis joint along lines 3-3 of FIG. 2.

The clevis joint 30 can be shown in greater detail in FIG. 3. Specifically, FIG. 3 depicts a sectional view along lines 3-3 of FIG. 2. A bearing or, more specifically, a spherical plain bearing 50 is employed to allow multi-directional movement of the apex 28 of the A-frame 24 in relation to the clevis joint 30. A first thrust washer, or other spacer, 52 may be positioned on a first side of the spherical bearing 50 and an expandable thrust washer 54 may be positioned on a second side of the spherical bearing. The expandable thrust washer 54 includes an inner ring 56 and an outer ring 58 and is configured to take up space along the axis of the clevis joint 30 or, more specifically, the axis of the pin 42. Thus, the expandable thrust washer 54 reduces the clearance that was necessary to allow for assembly.

The inner ring 56 is shown generally in FIG. 4. The inner ring 56 has a generally annular shape and includes a threaded portion 60 on an external surface of a first end 62 of the inner ring. The first end 62 is configured to engage an inner surface of the outer ring 58. A second end 64 of the inner ring is configured to contact a bearing surface, such as, for example, the spherical plain bearing 50. An inner surface diameter of the inner ring 56 may be any desirable dimension for receiving a pin, such as, for example, the pin 42.

The outer ring 58 is also generally annular and is shown generally in FIG. 5. The outer ring 58 has a threaded portion 70 on an internal surface of a first end 72 of the outer ring. The first end 72 is configured to engage the threaded portion 60 of inner ring 56 and receive at least a portion of the inner ring therein. Therefore, the expandable thrust washer 54 has a variably selected length. Specifically, the inner ring 56 may be rotatably received within a portion of the outer ring 58 to define a first or initial length of the expandable thrust washer 54. The inner ring 56 may be also rotated in an opposite direction to define a second or expanded length of the expandable thrust washer 54, which is greater than the first or initial length. The second or expanded length may be around about two inches, or any other useful length. It should be appreciated that the expandable thrust washer may be utilized at any length between the first length and the second length. One skilled in the art will also appreciate that the outer ring 58 may be rotated with respect to the inner ring 56 to achieve the first and second lengths.

A second end 74 of the outer ring 58 is configured to contact parallel plate 40 of the clevis joint 30. The outer ring 58 may also include a plurality of lock engagement surfaces, such as, for example, surface 76 and surface 78. Although sixteen generally planar lock engagement surfaces are shown, any number of lock engagement surfaces may be employed. In addition, the lock engagement surfaces may include any useful shape or texture thereon.

One skilled in the art will appreciate that, with a minor redesign, the second end 64 of the inner ring 56 may be configured to contact parallel plate 40 of the clevis joint 30, while the second end 74 of the outer ring 58 may be configured to contact a bearing surface, such as, for example, the spherical plain bearing 50. Additionally, although the expandable thrust washer 54 includes an inner ring 56 and an outer ring 58 that are distinct from the clevis joint 30, one skilled in the art will appreciate that one of the inner ring and the outer ring may be integral with, or welded to, the parallel plate 40 of the clevis joint.

Each of the inner ring 56 and outer ring 58 of the expandable thrust washer 54 may be made from any steel, bronze, plastic, or other material. Each of the inner ring 56 and outer ring 58 can have various inside and outside diameters as needed. Surface finishes, heat treatments, and various other considerations may be addressed as necessary, depending on the specific usage of the expandable thrust washer 54.

FIG. 6 is a partial sectional view along lines 3-3 of FIG. 2, showing an inner locking mechanism for use with the expandable thrust washer 54. Specifically, the inner locking mechanism includes a dowel pin 80, or any other pin or structure, that is positioned within at least a portion of the parallel plate 40 of the clevis joint 30. The dowel pin 80 may be inserted into at least a portion of the inner ring 56 to prevent rotational movement of the inner ring relative to the parallel plate 40 of the clevis joint 30.

Figure 7:
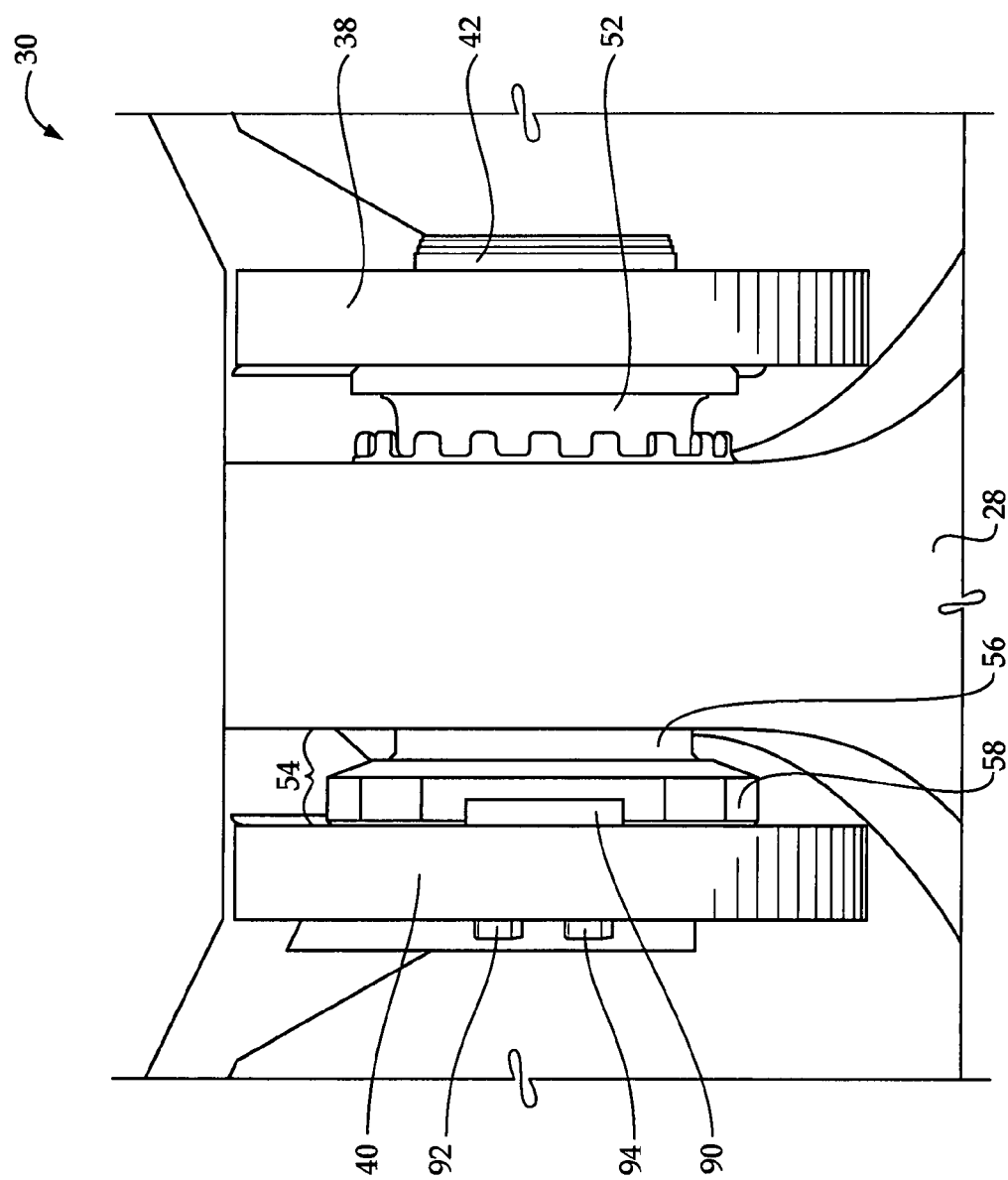
FIG. 7 is a bottom diagrammatic view of the clevis joint showing an outer locking mechanism for use with an expandable thrust washer according to the present disclosure.

An outer locking mechanism for use with the expandable thrust washer 54 is shown generally in FIG. 7. The outer locking mechanism includes an elongated locking member 90 for engaging a lock engagement surface, such as, for example, lock engagement surface 76 of the outer ring 58. Two bolts or pins 92 and 94 extend from the locking member 90 through the parallel plate 40 to secure the locking member in place. The locking member 90 engages the lock engagement surface 76 to prevent rotational movement of the outer ring 58 relative to the parallel plate 40 of the clevis joint 30.

Although a locking arrangement is shown for locking both the inner ring 56 and the outer ring 58 with respect to the plate 40 of the clevis joint 30, it should be appreciated that alternative locking arrangements are contemplated. For example, inner ring 56 and outer ring 58 may be locked with respect to each other after the length of the expandable thrust washer 54 has been expanded. In this arrangement, and various others, the expandable thrust washer 54 may be free to rotate about the pin 42. Any locking arrangement that prevents rotational movement of one of the inner ring 56 and the outer ring 58 with respect to the other, once the desired length of the expandable thrust washer has been achieved, is contemplated.

INDUSTRIAL APPLICABILITY

Referring to FIGS. 1-8, a support group and rear axle support assembly 20 for a machine 10 includes a rear axle 12 rigidly connected to a first end 22 of an A-frame structure 24. A second end 26 of the A-frame structure 24 or, more specifically, the apex or rotatable element 28 of the A-frame is pivotally connected to a main frame 14 of the machine 10 at a clevis joint 30. The clevis 30 extends from the center of a tube 32 having two end plates 34 and 36 welded to opposing inner surfaces of the main frame 14. The clevis joint 30 includes two parallel plates 38 and 40 having central openings configured to receive a pin 42. The apex 28 of the A-frame structure 24 houses a spherical plain bearing 50. Two thrust washers are positioned on either side of the bearing 50. A temporary pin is placed through the two thrust washers, the spherical plain bearing 50, and the apex 28 of the A-frame structure 24 to form a subassembly. The subassembly is positioned between the two clevis plates 38 and 40, and the pin 42 is passed through the subassembly, replacing the temporary pin.

To facilitate assembly, a thickness of the apex 28 of the A-frame 24, including the spherical plain bearing 50 and thrust washers, must be less than the clearance between the clevis plates 38 and 40. Once the A-frame apex 28 is secure, however, this clearance provides space along the axis of the clevis joint 30 along which the joint elements may slide. This movement may cause impact loading, which may, in turn, damage the elements of the joint, such as, for example, the spherical plain bearing 50 and the thrust washers.

The two-piece expandable thrust washer 54 of the present disclosure may be utilized to reduce the clearance along the axis of the clevis joint 30. One of the two thrust washers positioned on either side of the spherical plain bearing 50 may be replaced with the expandable thrust washer 54, wherein the expandable thrust washer has a first or initial length. This subassembly, including the expandable thrust washer 54, the spherical plain bearing 50, and the apex 28 of the A-frame structure 24, is positioned between the two plates 38 and 40 of the clevis joint 30. Once the pin 42 is inserted through the clevis plates 38 and 40 and the subassembly, the length of the expandable thrust washer is adjusted from the first or initial length to a second or expanded length to reduce clearance between the subassembly and the clevis joint 30.

Specifically, the inner ring 56 and outer ring 58 have a threaded connection and are rotatable with respect to one another about the threaded connection. One of the inner ring 56 and the outer ring 58 may be rotated to expand the length of the expandable thrust washer 54 along the pin 42. Expanding the expandable thrust washer 54 to this second or expanded length reduces the clearance between the clevis plates 38 and 40.

Once the expandable thrust washer 54 is at the second or expanded length, each of the inner ring 56 and the outer ring 58 may be locked. Although various locking mechanisms are contemplated, one example includes a dowel pin 80 inserted through the clevis plate 40 and into at least a portion of the inner ring 56 to prevent rotational movement of the inner ring with respect to the clevis joint 30. Elongated locking member 90 may be positioned adjacent and parallel to one of the plurality of lock engagement surfaces, such as, for example, lock engagement surface 76, of the outer ring 58. The locking member 90 may be secured to the clevis plate 40 using one or more bolts 92 and 94. Locking member 90 prevents rotational movement of the outer ring 58 with respect to the clevis joint 30.

Figure 8:
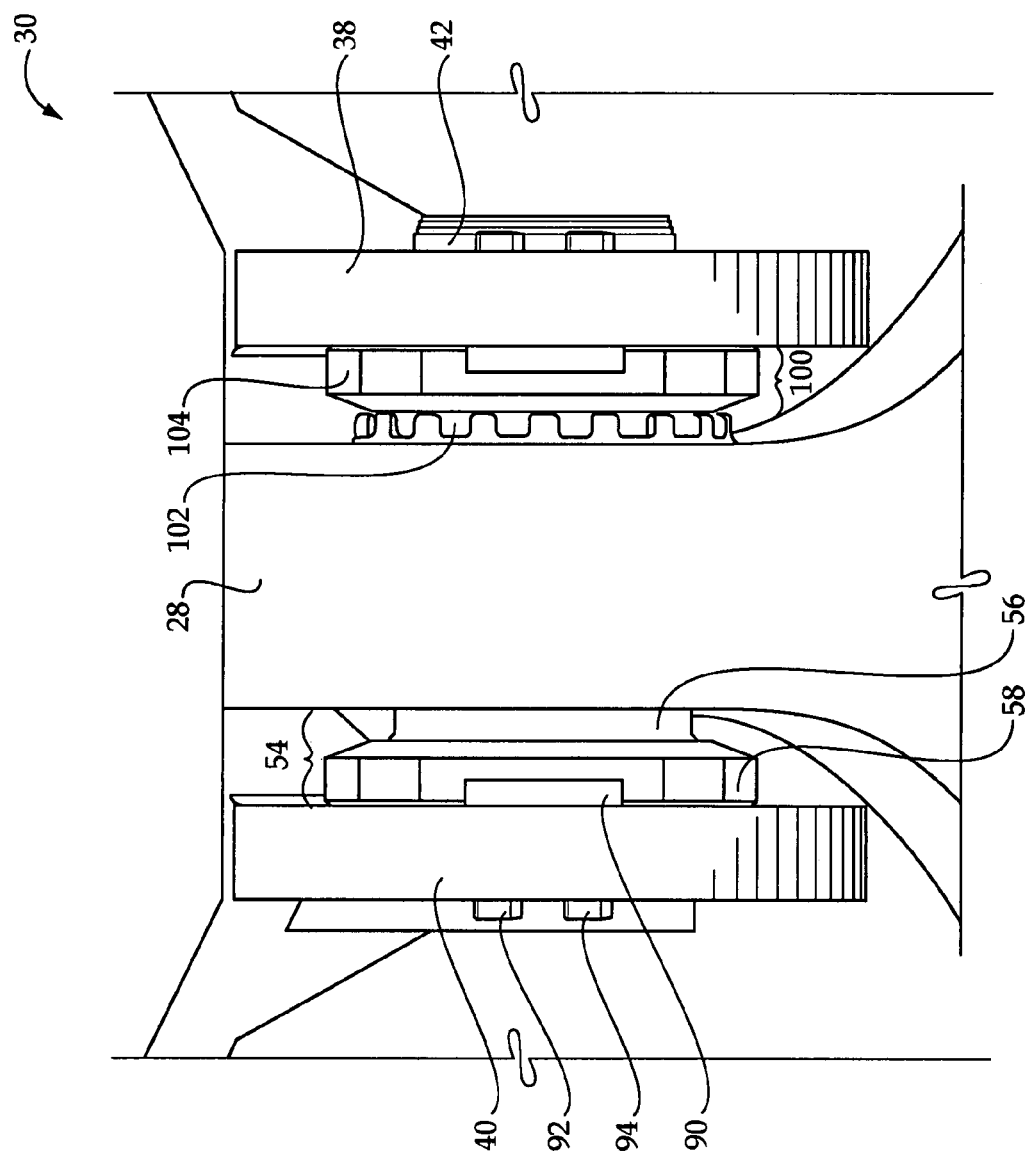
FIG. 8 is a bottom diagrammatic view of the clevis joint having two expandable thrust washers.

It may be desirable to utilize a second expandable thrust washer 100, as shown in FIG. 8. Expandable thrust washer 100 is similar to expandable thrust washer 54 and includes an inner ring 102 and an outer ring 104. Thrust washer 54 may be expanded to reduce clearance between clevis plate 40 and apex 28, and thrust washer 100 may be similarly expanded to reduce clearance between clevis plate 38 and apex 28. Locking mechanisms similar to the inner locking mechanism of FIG. 6 and the outer locking mechanism of FIG. 7 may be employed to lock both the inner ring 102 and the outer ring 104 with respect to the clevis plate 38. Utilizing two expandable thrust washers allows clearance to be reduced on each side of the apex 28 of the A-frame structure 24 while maintaining a centered position of the A-frame structure with respect to the clevis plates 38 and 40.

Reducing the clearance along the axis of the clevis joint 30 by utilizing one or two expandable thrust washers according to the present disclosure helps prevent damage to the elements of the joint that may occur as the elements slide along the axis.

It should be understood that the above description is intended for illustrative purposes only, and is not intended to limit the scope of the present invention in any way. Thus, those skilled in the art will appreciate that other aspects of the invention can be obtained from a study of the drawings, the disclosure and the appended claims.

What is claimed is:

1. A machine having a first frame structure and a second frame structure, comprising:
   a clevis joint connecting the first frame structure to the second frame structure, wherein the clevis joint includes two plates configured to receive a rotatable element of the first frame structure;
   an expandable thrust washer positioned on at least one side of the rotatable element;
   a pin extending through the two plates, the rotatable element, and the expandable thrust washer; and
   wherein the expandable thrust washer has a variably selected length and includes an outer ring configured to receive at least a portion of an inner ring.

2. The machine of claim 1, wherein the outer ring and the inner ring are joined by a threaded connection.

3. The machine of claim 1, wherein the first frame structure includes an A-frame structure.

4. The machine of claim 3, wherein the A-frame structure includes a first end connected to a rear axle assembly of the machine and a second end that includes the rotatable element.

5. The machine of claim 4, wherein the second frame structure includes a tubular member having two end plates on opposing ends thereof, wherein the two end plates are connected to a main frame of the machine.

6. The machine of claim 2, including an inner locking mechanism for preventing rotational movement of the inner ring relative to the clevis joint.

7. The machine of claim 6, including an outer locking mechanism for preventing rotational movement of the outer ring relative to the clevis joint.

8. The machine of claim 7, wherein the outer locking mechanism includes an elongated locking member for engaging a lock engagement surface of the outer ring, and the inner locking mechanism includes a dowel pin inserted into at least a portion of the inner ring.

9. A clevis joint assembly, comprising:
   a clevis joint having two plates configured to receive a rotatable element;
   an expandable thrust washer positioned on at least one side of the rotatable element;
   a pin extending through the two plates, the rotatable element, and the expandable thrust washer; and
   wherein the expandable thrust washer has a variably selected length and includes an outer ring configured to receive at least a portion of an inner ring.

10. The clevis joint assembly of claim 9, wherein the rotatable element houses at least a portion of a spherical bearing.

11. The clevis joint assembly of claim 9, further including a second expandable thrust washer positioned on a second side of the rotatable element.

12. The clevis joint assembly of claim 9, wherein the rotatable element includes an apex of an A-frame structure.

* * * * *